United States Patent
Lee et al.

(10) Patent No.: US 9,298,430 B2
(45) Date of Patent: Mar. 29, 2016

(54) METHOD OF COMPILING PROGRAM TO BE EXECUTED ON MULTI-CORE PROCESSOR, AND TASK MAPPING METHOD AND TASK SCHEDULING METHOD OF RECONFIGURABLE PROCESSOR

(71) Applicants: SAMSUNG ELECTRONICS CO., LTD., Suwon-si (KR); SEOUL NATIONAL UNIVERSITY R&DB FOUNDATION, Seoul (KR)

(72) Inventors: Jin-Hoo Lee, Seoul (KR); Moo-Kyoung Chung, Hwaseong-si (KR); Key-Young Choi, Seoul (KR); Yeon-Gon Cho, Hwaseong-si (KR); Soo-Jung Ryu, Hwaseong-si (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 186 days.

(21) Appl. No.: 14/051,910

(22) Filed: Oct. 11, 2013

(65) Prior Publication Data
US 2014/0109069 A1   Apr. 17, 2014

(30) Foreign Application Priority Data
Oct. 11, 2012 (KR) .................. 10-2012-0113103

(51) Int. Cl.
*G06F 9/45* (2006.01)

(52) U.S. Cl.
CPC ... *G06F 8/41* (2013.01); *G06F 8/45* (2013.01)

(58) Field of Classification Search
CPC .......... G06F 8/45; G06F 8/456; G06F 9/5066
USPC ......................................................... 717/149
See application file for complete search history.

(56) References Cited

U.S. PATENT DOCUMENTS

| 8,020,163 | B2 | 9/2011 | Nollet et al. |
| 2006/0161755 | A1* | 7/2006 | Uchikawa et al. ............ 711/170 |
| 2009/0213755 | A1 | 8/2009 | Lu |
| 2010/0218190 | A1 | 8/2010 | Das et al. |

(Continued)

FOREIGN PATENT DOCUMENTS

CA   2275826 A1   12/2000

OTHER PUBLICATIONS

Dimitroulakos et al., "Design space exploration of an optimized compiler approach for a generic reconfigurable array architecture", Feb. 24, 2007, The Journal of Supercomputing, vol. 40, Issue 2, 31 pages.*

(Continued)

*Primary Examiner* — Hang Pan
*Assistant Examiner* — Hui-Wen Lin
(74) *Attorney, Agent, or Firm* — Sughrue Mion, PLLC

(57) ABSTRACT

A method of compiling a program to be executed on a multicore processor is provided. The method may include generating an initial solution by mapping a task to a source processing element (PE) and a destination PE, and selecting a communication scheme for transmission of the task from the source PE to the destination PE, approximately optimizing the mapping and communication scheme included in the initial solution, and scheduling the task, wherein the communication scheme is designated in a compiling process.

24 Claims, 15 Drawing Sheets

(56) References Cited

U.S. PATENT DOCUMENTS

2010/0293312 A1 11/2010 Sonnier et al.
2012/0144401 A1* 6/2012 Faraj .............................. 719/313

OTHER PUBLICATIONS

Suhendra et al., "Integrated Scratchpad Memory Optimization and Task Scheduling for MPSoc Architectures", Oct. 23-25, 2006, ACM, 10 pages.*

Galea et al., "A parallel simulated annealing approach for the mapping of large process networks", May 21-25, 2012, IEEE, IEEE 26th international, 6 pages.*

Lee et al., "A Task Remapping Technique for Reliable Multi-core Embedded Systems", Oct. 24-29, 2010, ACM, 10 pages.*

Communication issued on Oct. 1, 2014 by the European Patent Office in related application No. 13188361.3.

Dimitroulakos, Grigoris et al., "Design space exploration of an optimized compiler approach for a generic reconfigurable array architecture", The Journal of Supercomputing, vol. 40, No. 3, Feb. 24, 2007, total of 31 pages.

* cited by examiner

METHOD OF COMPILING PROGRAM TO BE EXECUTED ON MULTI-CORE PROCESSOR, AND TASK MAPPING METHOD AND TASK SCHEDULING METHOD OF RECONFIGURABLE PROCESSOR

CROSS-REFERENCE TO RELATED APPLICATION

This application claims priority from Korean Patent Application No. 10-2012-0113103 filed in the Korean Intellectual Property Office on Oct. 11, 2012, the disclosure of which is incorporated herein by reference in its entirety.

BACKGROUND

1. Field

Apparatuses and methods consistent with the following description relate to a method for compiling a program to be executed on a multi-core processor, and task mapping and task scheduling of the multi-core processor.

2. Description of the Related Art

Comparable programming for characteristics of a multi-core architecture may improve the performance of multicore architecture.

In programming using a multicore processor, mapping refers to a process of determining which processing elements to execute in terms of the tasks or individual parts of an application and representing the determination as a graph.

Further, scheduling is a process that may follow the mapping process. Scheduling may determine an order and timing according to which the respective tasks are executed by the processing elements.

However, a multicore program executed on a multicore is so highly complex that manual writing of the program results in low programming productivity and/or low program quality. Further, the complexity of programming may be increased by the mapping and scheduling processes.

In particular, due to the high degree of complexity of the program, significant difficulties may follow when a program developer individually designates a particular communication scheme for each core-mapped task to be processed between a source processing element and a destination processing element.

SUMMARY

According to an aspect of an exemplary embodiment, there is provided a method of compiling a program to be executed on a multicore processor, the method including: generating an initial solution by mapping a task to a source processing element (PE) and a destination PE, and selecting a communication scheme for transmission of the task from the source PE to the destination PE; approximately optimizing the mapping and communication scheme included in the initial solution; and scheduling the task, wherein the communication scheme is designated in a compiling process.

According to an aspect of another exemplary embodiment, there is provided a method of mapping a task in a multi-core processor, the method including: mapping the task to a first processing element from among multiple processing elements in the multi-core processor; moving the task from the first processing element to a second processing element at a first probability between 0 and 1; and replacing the task that has been moved to the second processing element at the first probability with another task mapped to a third processing element at a second probability between 0 and 1.

According to an aspect of another exemplary embodiment, there is provided a method of scheduling tasks in a multi-core processor, the method including: attempting to schedule two or more tasks within a first time period wherein the two or more tasks are to be executed on two or more processing elements of a multi-core processor; if the scheduling attempt fails due to one task overlapping another task, calculating a length of time during which the tasks are overlapping each other; and re-attempting to schedule the two or more tasks within a second time period which is equal to a sum of the first time period and the calculated length of time for which the tasks are overlapping.

BRIEF DESCRIPTION OF THE DRAWINGS

The above and/or other aspects will be more apparent by describing in detail exemplary embodiments, with reference to the accompanying drawings, in which.

DETAILED DESCRIPTION

Figure 1A:
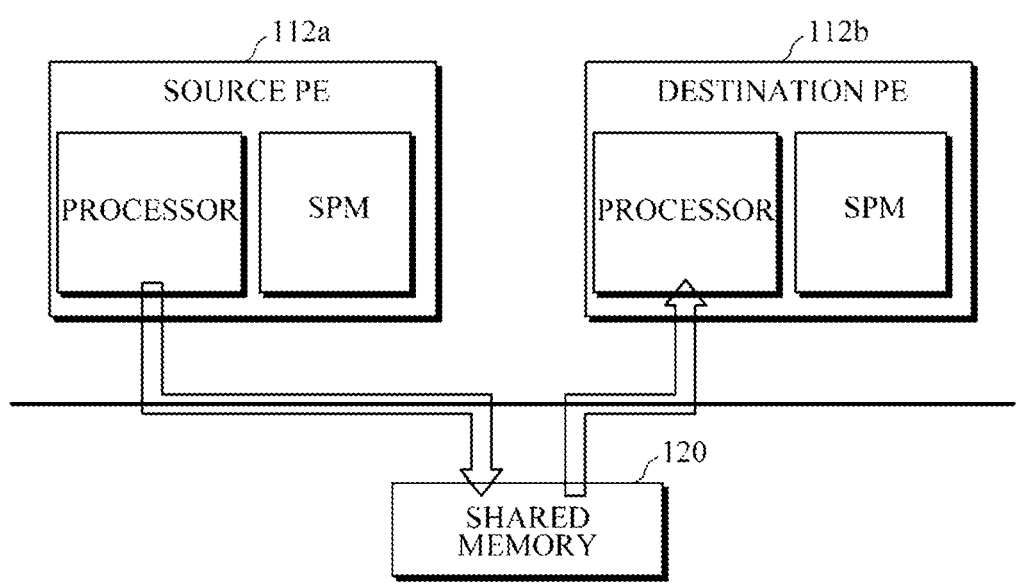
FIGS. 1A and 1B are diagrams illustrating processing elements of a multicore processor, which communicate with each other using a shared memory.

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Throughout the drawings and the detailed description, unless otherwise described, the same drawing reference numerals will be understood to refer to the same elements, features, and structures. The relative size and depiction of these elements may be exaggerated for clarity, illustration, and convenience.

Figure 1B:
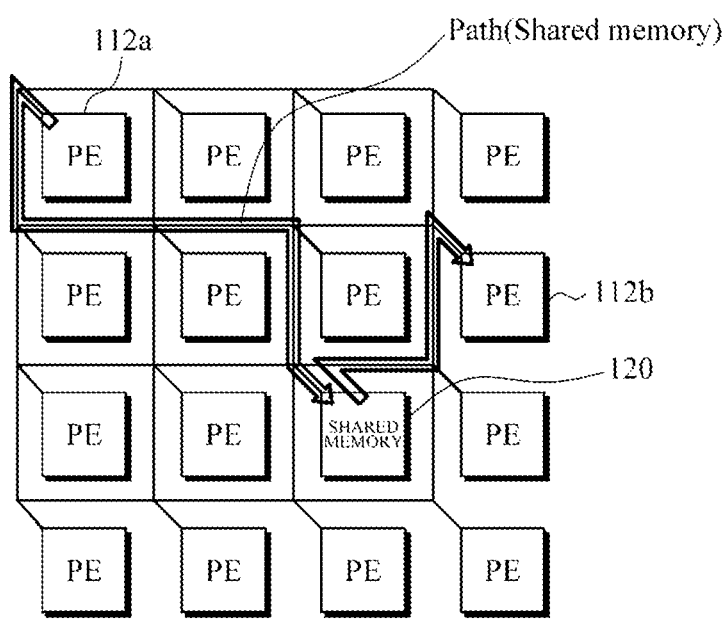

FIGS. 1A and 1B are diagrams illustrating processing elements of a multicore processor, which may communicate with each other using a shared memory 120.

In FIGS. 1A and 1B, the same reference numerals represent the same elements.

Processing elements (PEs) 112a and 112b of a multicore processor may communicate with each other. Referring to FIGS. 1A and 1B, the processing elements communicate with each other with the help of and through the shared memory 120.

The communication via the shared memory may be performed in stages, as follows:

A source PE 112A may writes data to the shared memory 120.

The shared memory 120 transmits an acknowledgement (ACK) to the source PE 112a.

Once the data writing is complete, the source PE 112a may transmit a synchronization (SYNC) packet to a destination PE 112b.

The destination PE 112b may then transmit a read request to the shared memory 120.

The shared memory 120 may transmit the data stored by the PE 112a to the destination PE 112b.

This method may be easy to program and facilitate multitasking. However, a long path from the processing element 112a to the shared memory 120 (labeled in FIG. 1B as "path (shared memory)") may frequently occur. Also, and the shared memory 120 in use may also have a large size and a slow operation speed. Further, there may exist drawbacks such as large power consumption and slow task execution speeds.

Figure 2A:
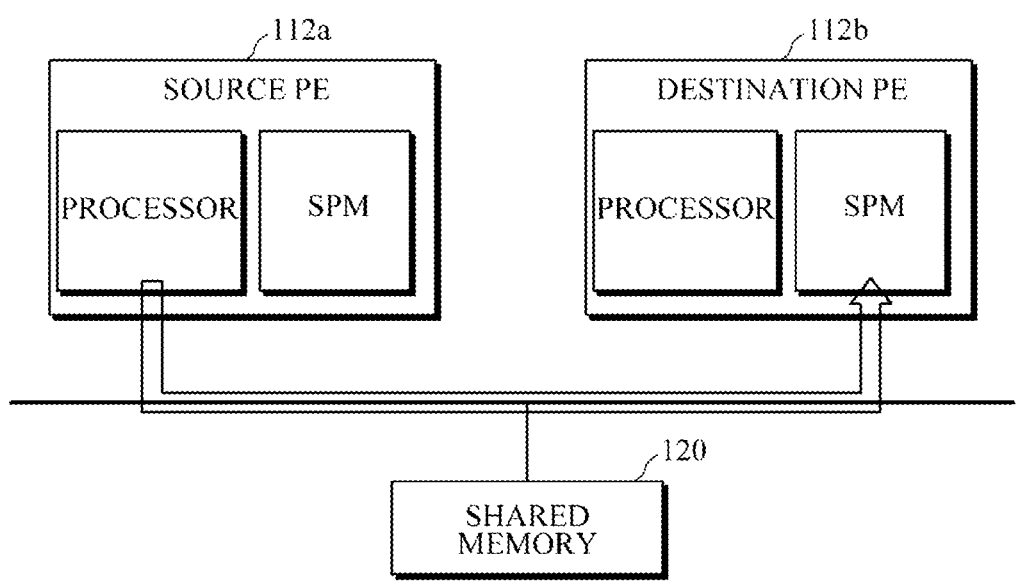
FIGS. 2A and 2B are diagrams illustrating processing elements of a multicore processor, which communicate with each other by passing messages.
Figure 2B:
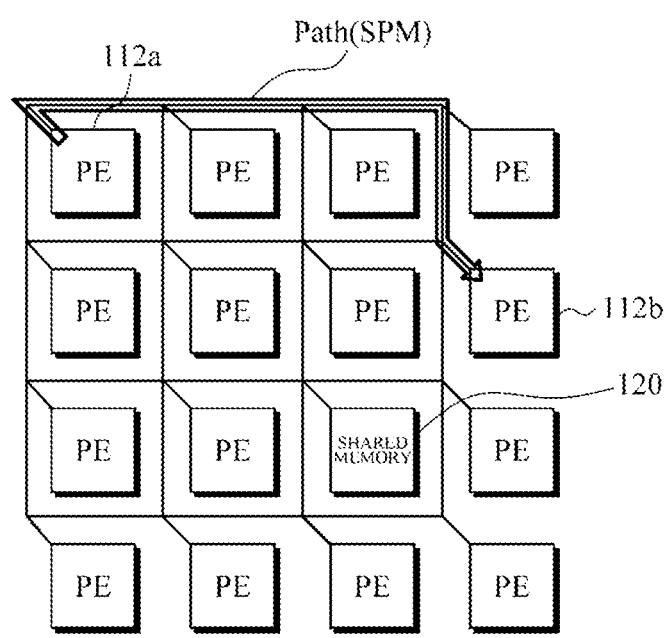

FIGS. 2A and 2B are diagrams illustrating processing elements 112a and 112b of a multicore processor, which may communicate with each other by transmitting messages. Referring to FIGS. 2A and 2B, processing elements (PEs) 112a and 112b may communicate with each other using a scratch-pad memory (SPM) that may be disposed in or near each processing element. A source PE 112a may therefore directly transmit data to a destination PE 112b, rather than having to write the data to a shared memory 120, which is commonly used by all processing elements of the multicore processor. In this case, the data may be transmitted through the shortest path (illustrated in FIG. 2B as "path(SPM)") from the source PE 112a to the destination PE 112b, and thus transmission time can be reduced, as compared to the path ("path(shared memory") shown in FIG. 1B, which routes to and from the shared memory 120. Further, generally an SPM may have a comparatively small capacity compared to a shared memory. Therefore, data transmission, called a "message passing method," using an SPM may have the advantage of lower power consumption.

However, due to the small and limited capacity of the SPM, it may not be possible to transmit all messages using the message passing method.

The benefits obtained from the application of the message passing method may vary depending on diverse factors, such as, a distance between two computers. Therefore, it may be proper to select a particular communication scheme between the shared memory-based communication scheme and the message passing-based communication scheme, during the mapping and/or scheduling processes.

Figure 3:
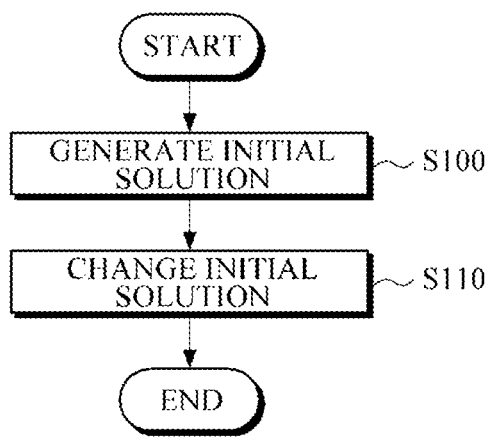
FIG. 3 is a flowchart illustrating a method of mapping tasks and determining a communication scheme according to an exemplary embodiment.

FIG. 3 is a flowchart illustrating a method of mapping tasks and determining a communication scheme according to an exemplary embodiment.

During task scheduling tasks are assigned to processing elements and a particular communication scheme is determined for transmission of each task between a source PE and a destination PE.

The method illustrated in FIG. 3 may be based on a simulated annealing (SA) algorithm that is a probabilistic algorithm.

The basic procedures of the SA algorithm are as follows:

Create an initial solution.

Obtain a new solution by randomly changing the initial solution.

If the new solution is better than the initial solution, replace the initial solution with the new solution, and if not, replace the initial solution with the new solution according to a predetermined probability r (r is greater than 0 and smaller than 1).

Through the procedures of (1) to (3), the SA algorithm can achieve a better solution than a local search algorithm.

The method shown in FIG. 3 may include two steps: generation of an initial solution (S100) and change of the initial solution (S110).

In S100, initial solutions are created. Each solution may include a task mapping state with respect to each PE and a particular communication scheme for transmission of each task between a source PE and a destination PE.

Then, a new solution may be created by changing the task mapping state and communication scheme for each task.

Figure 4:
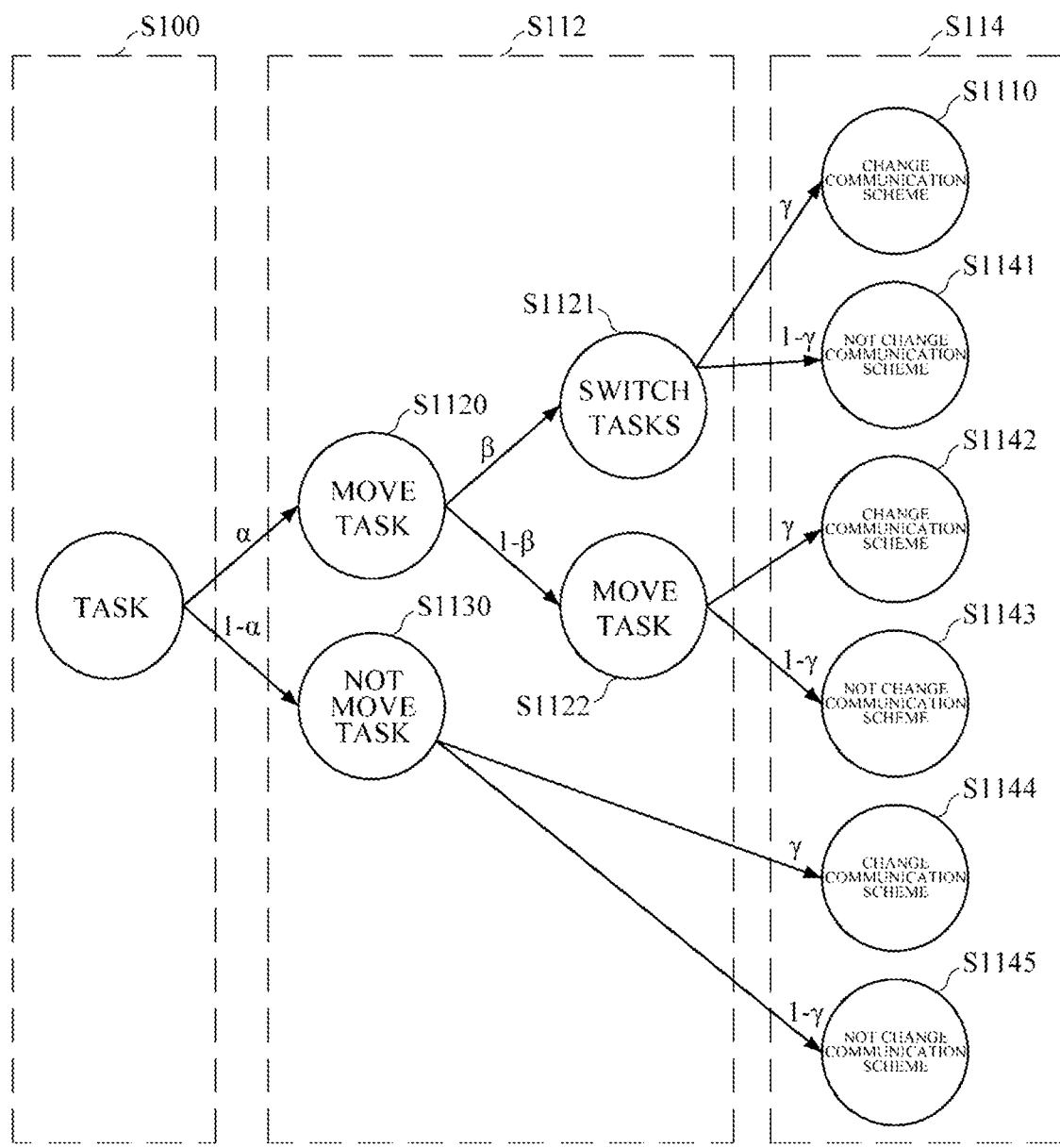
FIG. 4 is a diagram illustrating in detail a step of changing an initial solution according to an exemplary embodiment.

FIG. 4 is a diagram illustrating in detail an operation step of changing an initial solution, similar to operation S110 of FIG. 3, according to an exemplary embodiment.

Operation S110 may include task moving operation S112 and communication scheme changing operation S114.

In S112, it is determined whether a task is moved to another PE with respect to the task mapped to a particular PE in the initial solution. For example, the task may be moved from the particular PE to another PE at a probability of a in S1120. Here, $\alpha$ is a value between 0 and 1. A probability of the task not moving is $(1-\alpha)$ in S1130.

The task moving to the other PE may be switched with another task of a different PE at a probability of $\beta$ in S1121. Here, $\beta$ is a value between 0 and 1.

Figure 5:
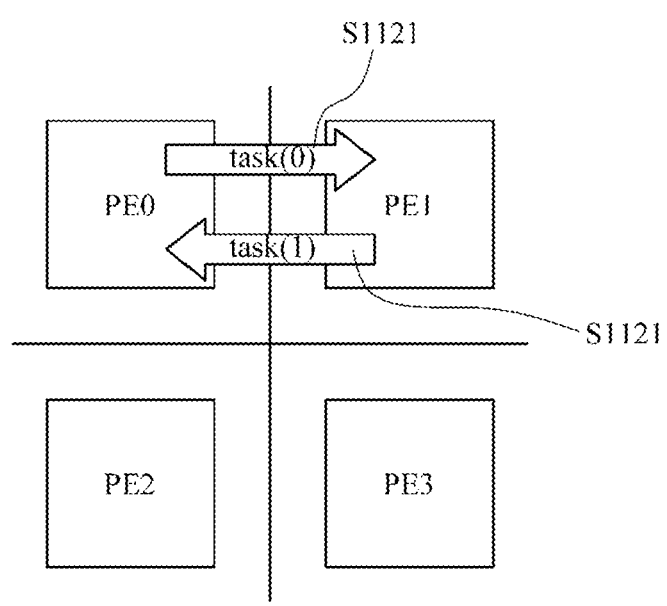
FIG. 5 is a diagram illustrating a case in which tasks are switched between processing elements at a probability of $\beta$ according to an exemplary embodiment.

FIG. 5 is a diagram illustrating a case in which tasks are switched between processing elements at a probability of $\beta$ according to an exemplary embodiment.

Referring to FIG. 5, task 0 is mapped to processing element PE0 and task 1 is mapped to processing element PE1. In S1121, the task 1 mapped to PE0 is moved to PE1 and the task 0 mapped to PE1 is moved to PE0 at a probability of $\beta$.

Referring back to FIG. 4, the task mapped to PE0 may be moved to yet another PE (PE2) at a probability of $(1-\beta)$.

Figure 6:
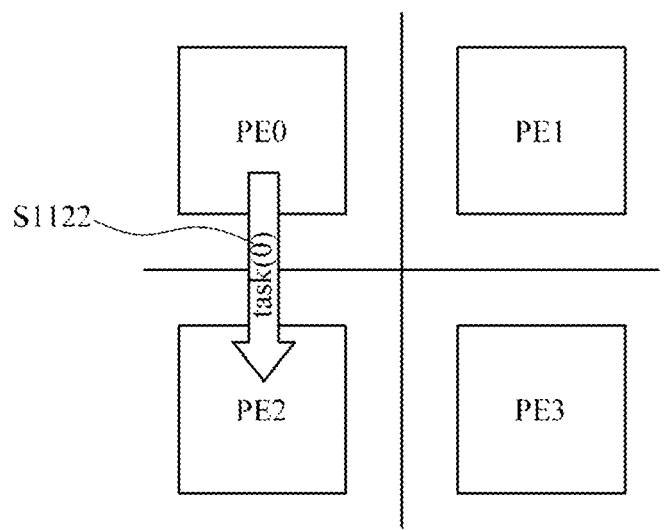
FIG. 6 is a diagram illustrating a case in which a task is moved from one processing element to another processing element at a probability of $(1-\beta)$ according to an exemplary embodiment.

FIG. 6 is a diagram illustrating a case in which a task is moved from one processing element to another processing element at a probability of $(1-\beta)$.

In S1122, task 0 mapped to PE0 is moved to processing element PE2.

Referring back to FIG. 4, in S114, it is determined whether a communication scheme of a source PE and destination PE for a particular task is changed or not.

For example, a current communication scheme may be changed to another communication scheme at a probability of $\gamma$ in S1110, S1142, and S1144. If the current communication scheme is based on message passing, a probability of changing the communication scheme using a shared memory is $\gamma$. Here, $\gamma$ is a value between 0 and 1.

In S114, the particular communication scheme may not be changed to another scheme at a probability of (1−γ) in S1141, S1143, and S1145.

In addition, after operation S110, optimization may need to be additionally performed on the changed solution.

When considering a fact that a size of SPM for use in a message passing-based communication scheme is limited, a PE attempting to achieve an optimized solution may need to make maximum use of SPM without exceeding the SPM's size.

In addition, a gain obtained from the use of the message passing-based communication scheme, instead of a shared memory-based communication scheme, may vary depending on various factors, such as a communication distance between PEs, communication data traffic, or usage rate of SPM, etc. Therefore, it may be appropriate to preferentially apply the message passing-based communication scheme to a task that brings about more advantages from the message passing-based communication scheme than from the shared memory-based communication scheme.

A gain G(t) with respect to a task t between a source PE and a destination PE may be represented as equation (1) below.

$$G(t) = (L \times A)/T \qquad (1),$$

where L represents a communication distance between a source PE and a destination PE, A represents data traffic between the source PE and the destination PE, and B is the sum of SPM usage.

Heuristics, more specifically, a greedy algorithm heuristic may be used for an optimization process. The optimization process following the changing (S110) of the initial solution can be considered as heuristic optimization.

Figure 7:
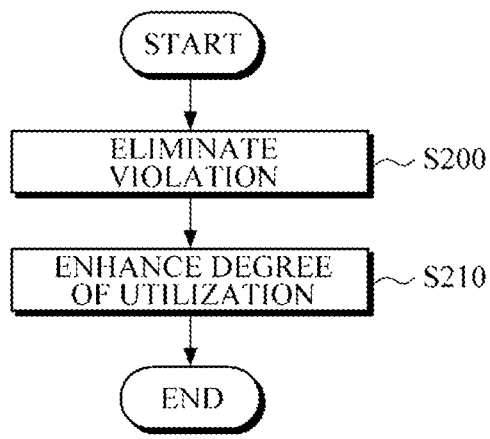
FIG. 7 is a flowchart illustrating an optimization process according to an exemplary embodiment.

FIG. 7 is a flowchart illustrating an optimization process according to an exemplary embodiment.

Referring to FIG. 7, the optimization process includes the stages of: violation elimination (S200) and utilization enhancement (S210). In operation S200, violation may be eliminated from mapping and/or communication schemes for each task included in the changed initial solution obtained in operation S110.

The mapping and communication schemes for each task, which are included in the solution obtained after operation S110 (change of the initial solution), may likely be associated with PEs transmitting data with sizes exceeding sizes of SPMs (hereinafter, the PEs are referred to as "violating" PEs). In operation S200, the violation of the violating PEs may be eliminated.

For example, the violating PEs are arranged in the order of data size that exceeds the size of SPM. Then, the message passing-based communication scheme designated to each task mapped to the arranged violating processing element(s) is changed to a shared memory-based communication scheme, until the violation is overcome (that is, until the data size of each violating PE does not exceed the size of SPM).

If there are many tasks whose communication scheme needs to be changed, the communication scheme may be sequentially changed, starting from the task with the lowest gain which is obtained by Equation 1.

Once the change of communication scheme of all tasks assigned to the violating PEs, starting from the PE with the smallest excess, is completed, a valid solution can be obtained.

In operation S210, a process for further utilizing an unused space of SPM in each PE is performed.

After the violation elimination operation, some PEs may have SPM with unused space that may be an excessively large. This may be because of either the initial solution or the change of the communication scheme of the task that requires a large memory capacity to the shared memory-based communication scheme in the violation elimination process.

In operation S210, the PEs containing SPM with unused space may be arranged in the order of an amount of the unused space of SPM. Then, the shared memory-based communication scheme that is designated for each task assigned to the arranged PEs is changed to the message passing-based communication scheme.

In the case that there are a number of tasks of which communication scheme are to be changed, it may be appropriate that the communication scheme of a task with higher gain is preferentially changed. The gain for each task is obtained by Equation 1.

Once the communication schemes of each task with respect to all PEs with available capacity of SPM is completed, starting from the PE with the largest unused space in SPM, the degree of utilization of SPM can be enhanced more than before. Thus, the solution is further optimized.

Scheduling process needs to follow the approximate optimization operation.

While mapping is involved with how to determine PEs to which tasks are assigned, scheduling is a process to determine timing at which to execute each assigned task.

An example described herein suggests a scheduling algorithm compatible with cyclic applications having backward dependency, as well as with acyclic applications. This algorithm will be referred to as a "modified modulo algorithm" for convenience of description.

Modulo algorithm is a type of priority-based scheduling algorithm. Modulo algorithm estimates an initiation interval (II) which refers to a time interval between cycles of iterations, and then attempts to schedule all tasks within the estimated time interval. If the attempt to schedule the tasks fails, the iteration interval is gradually raised until an optimized II is found.

Figure 8:
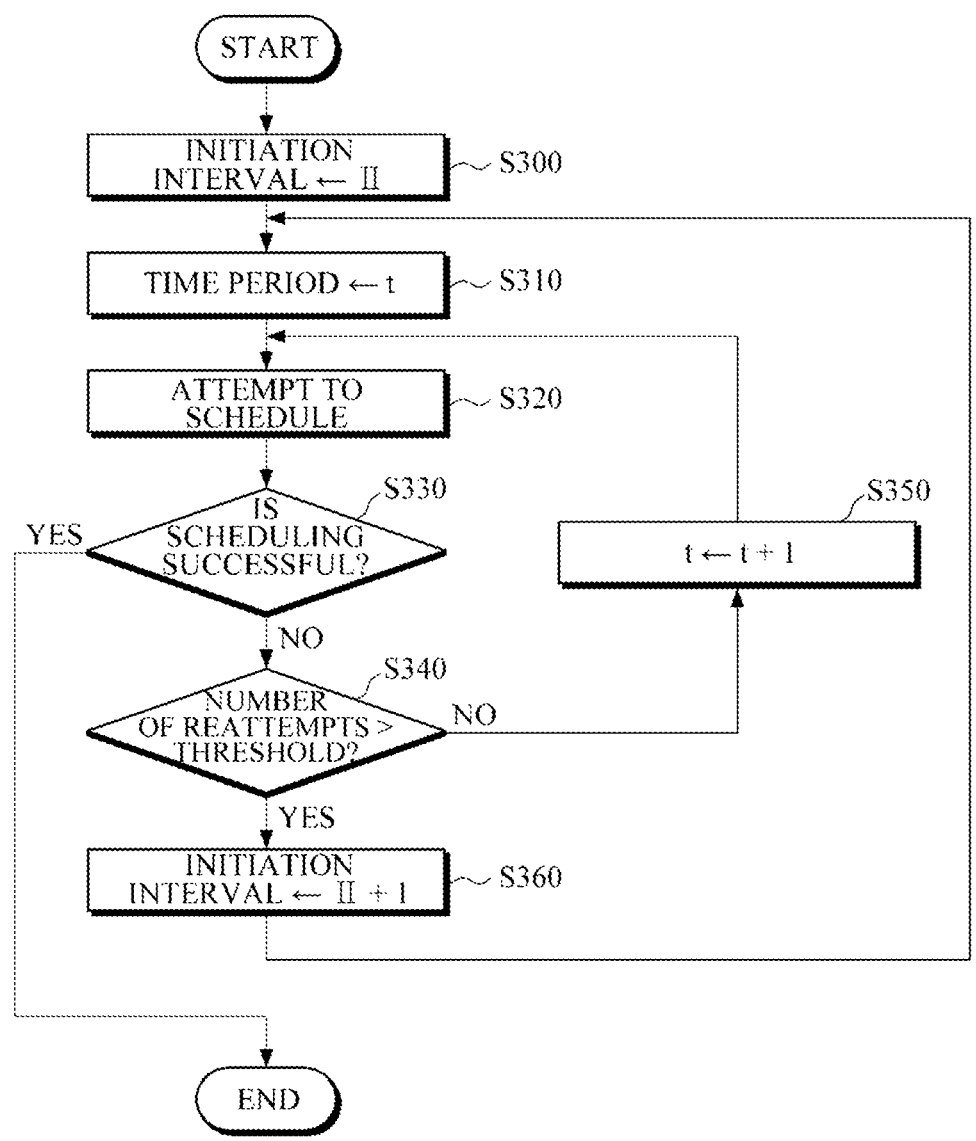
FIG. 8 is a flowchart illustrating an instruction scheduling operation using a modulo algorithm according to an exemplary embodiment.

FIG. 8 is a flowchart illustrating an instruction scheduling operation using a modulo algorithm according to an exemplary embodiment.

The modulo algorithm is an algorithm suited for scheduling instructions. For example, an iteration interval of a routine that is to be iteratively executed is assigned within the initiation interval (II) in operation S300. A condition may be applied such that scheduling is performed within a predetermined time period t in operation S310. The scheduling is repeatedly attempted in operation S320 with the conditions of the iteration interval and the time period. When the scheduling attempt fails, the instruction scheduling attempts are made by increasing the time period by 1 (or unit time) in operation S350. If a determination is made that it is not possible to schedule the instruction within a predetermined initiation interval (II) between iteration cycles of the instruction in operation S340, the initiation interval may be re-set to II+1 by increasing the initiation interval by 1 (or "unit time") in operation S360. In this case, the scheduling attempt starts from the predetermined time period (t).

Though this method may be appropriate for scheduling instructions, it may not be as conducive for task scheduling because it may take excessively large amounts of time to schedule tasks by using this method. Hence, the algorithm that is to be used for instruction scheduling may not be used in task scheduling.

Figure 9:
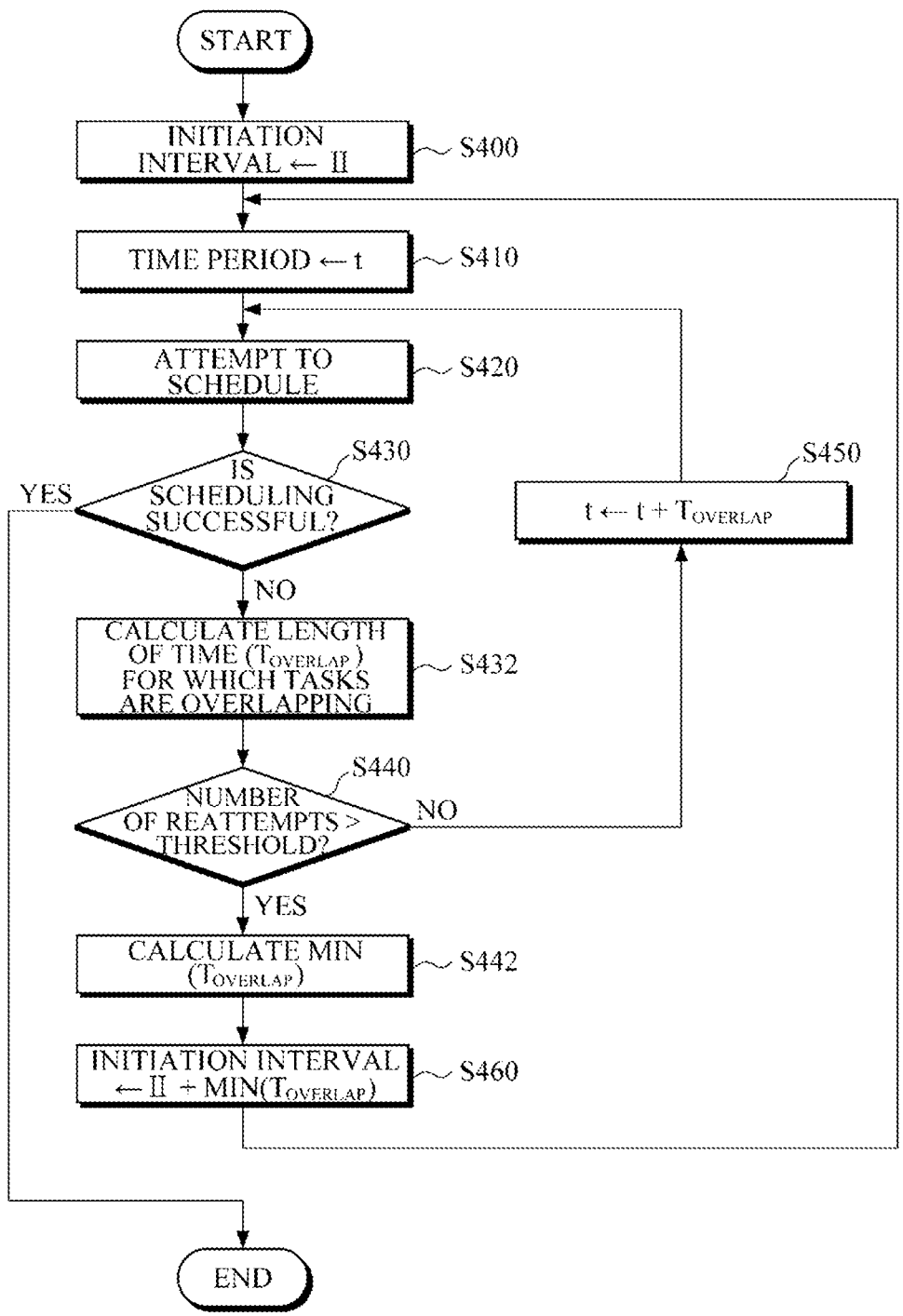
FIG. 9 is a flowchart illustrating task scheduling operation using a modified modulo algorithm according to an exemplary embodiment.

FIG. 9 is a flowchart illustrating a task scheduling operation using a modified modulo algorithm according to an exemplary embodiment.

Particularly, in operation S400, an iteration interval is assigned within an initiation interval, so as to schedule tasks with iteratively executed routines. In this case, in operation S410, conditions are applied such that the scheduling is performed within a predetermined time period (t). In operation S420, scheduling attempts are repeatedly made under the conditions of the iteration interval and the predetermined time period. When the scheduling attempt fails, scheduling is re-attempted in operation S450.

In the event of a failure of scheduling due to a particular task (task (a)) overlapping another task (task (b)), in operation S432, it calculates a length $t_{overlap}$ of a time period during which the tasks are overlapping. The modified modulo algorithm differs from the general modulo algorithm in this respect. In operation S450, a new time period ($t+t_{overlap}$) is set and the scheduling is attempted again within the new time period. Hence, the modified modulo algorithm is different from the general modulo algorithm that increases the time period by a unit time (e.g., "1") and re-attempts the scheduling within the new time period.

If a determination is made in operation S440 that it is not possible to perform scheduling within the initiation interval (II) that is predetermined between the iteration cycles, the iteration interval may be re-set by increasing the II in operation S460. In this case, the scheduling attempts are made again, starting from the predetermined time period (t).

Another difference between the modified modulo algorithm and the general modulo algorithm is that, in operation S442, the modified modulo algorithm calculates a minimum value (i.e., $min(t_{overlap})$) of the length $t_{overlap}$ of overlapping time period which is obtained based on the initiation interval (II) just before the re-setting of the iteration interval. In operation S460, an attempt to schedule a task with the II set to $II+min(t_{overlap})$ is made. That is, the modified modulo algorithm is different from the general modulo algorithm in that the initiation interval (II) is increased by a unit time (e.g., "1") and scheduling attempt is made again with the new initiation interval (II).

The execution time of task scheduling may be remarkably reduced when using the modified modulo algorithm, as compared to when using the general modulo algorithm. This is because, if the same number of re-attempts of scheduling are made, the modified modulo algorithm can make scheduling attempts with a time period that is longer than a time period set by the general modulo algorithm because $t_{overlap}$ and min ($t_{overlap}$) are each longer than a unit time.

In addition, the scheduling result of the modified modulo algorithm is not substantially lowered, as compared to the scheduling result of the general modulo algorithm.

Figure 10:
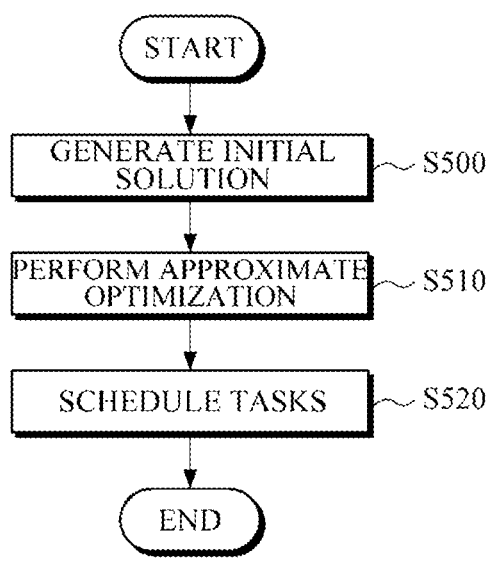
FIG. 10 is a flowchart illustrating a method of compiling a program to be executed on a reconfigurable processor according to an exemplary embodiment.

FIG. 10 is a flowchart illustrating a method of compiling a program to be executed on a reconfigurable processor according to an exemplary embodiment.

As shown in FIG. 10, the compiling method includes operations that include the generation of an initial solution (S500), performing approximate optimization (S510), and scheduling tasks (S520).

In operation S500, an initial solution is generated as described above, such that a number of tasks are mapped to a plurality of processing elements using a probabilistic algorithm and a particular communication scheme for each task to be transmitted between a source processing element and a destination processing element is designated. For example, a simulated annealing (SA) algorithm may be used as the probabilistic algorithm. The particular communication scheme may be selected between a shared memory-based communication scheme and a scratch pad memory (SPM) utilizing message passing-based communication scheme. Reassignment of each task mapped to the processing element according to the initial solution and/or change of the communication scheme designated for each task may be performed on the basis of probabilities for each scheme.

In operation S510, the mapping and communication schemes included in the initial solution are approximately optimized. The approximate optimization may use heuristic as described above.

For example, in operation S510, an optimization process may be performed to eliminate violation, such that the sum of sizes of data related to a task mapped to a particular processing element does not exceed the capacity of SPM.

In addition, the shared memory-based communication scheme designated to a task mapped to a processing element containing SPM with unused space is changed to a message passing-based communication scheme to enhance the degree of utilization of SPM.

In operation S520, scheduling of a number of tasks is performed.

Task scheduling may be performed by repeatedly performing the following operations: attempting to schedule the tasks within a predetermined time period, and when the scheduling attempt fails, calculating a length of a time period during which tasks are overlapping, then reattempting to schedule the tasks within a new time period that is obtained by adding the predetermined time period and the calculated overlapping time period.

Figure 11:
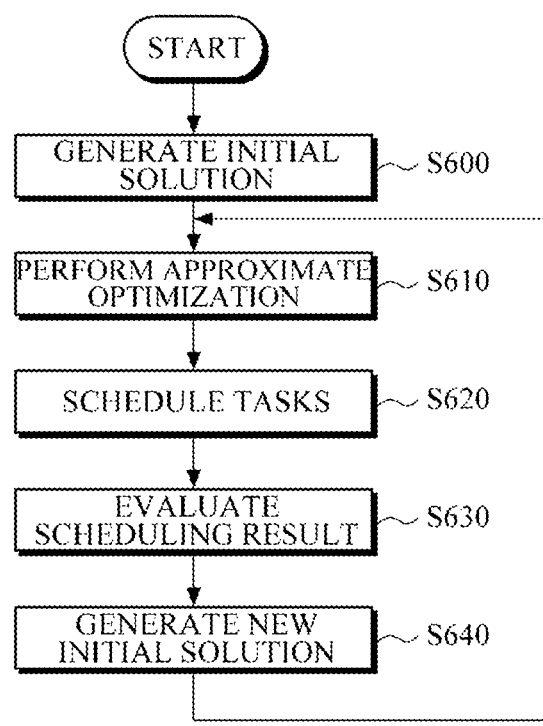
FIG. 11 is a flowchart illustrating a method of compiling a program to be executed on a reconfigurable processor according to an exemplary embodiment.

FIG. 11 is a flowchart illustrating a method of compiling a program to be executed on a reconfigurable processor according to an exemplary embodiment.

Operations S600, S610 and S620 are substantially similar to operations S500, S510 and S520 of FIG. 10, respectively.

The compiling method of FIG. 11 further includes evaluating (S630) of a scheduling result after the scheduling operation S620. Based on the evaluation result from operation S630, a new solution that is better than an initial solution obtained in operation S600 is generated in operation S640, and an approximate optimization operation S610 and the following operations are performed on the new solution.

Figure 12:
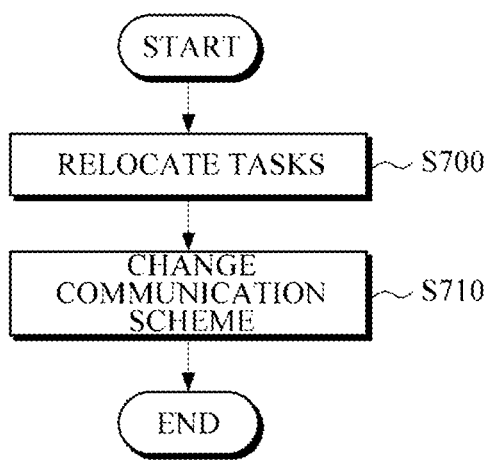
FIG. 12 is a flowchart illustrating a task mapping method performed by a reconfigurable processor according to an exemplary embodiment.

FIG. 12 is a flowchart illustrating a task mapping method performed by a reconfigurable processor according to an exemplary embodiment.

Referring to FIG. 12, the task mapping method includes the operations of a relocating of tasks (S700) and a changing of communication scheme (S710).

In operation S700, a task mapped to one of multiple processing elements of a multicore processor is moved to another processing element at a first probability ranging between 0 and 1.

Alternatively, the task that has been moved to the other processing element at the first probability may be switched with a task mapped to a different processing element, at a second probability ranging between 0 and 1.

In operation S710, a communication scheme for each task to be transmitted between a source PE and a destination PE is changed at a third probability ranging between 0 and 1.

Through the above operations of reassignment of tasks and change of communication scheme, more appropriate mapping results may be achieved.

Figure 13:
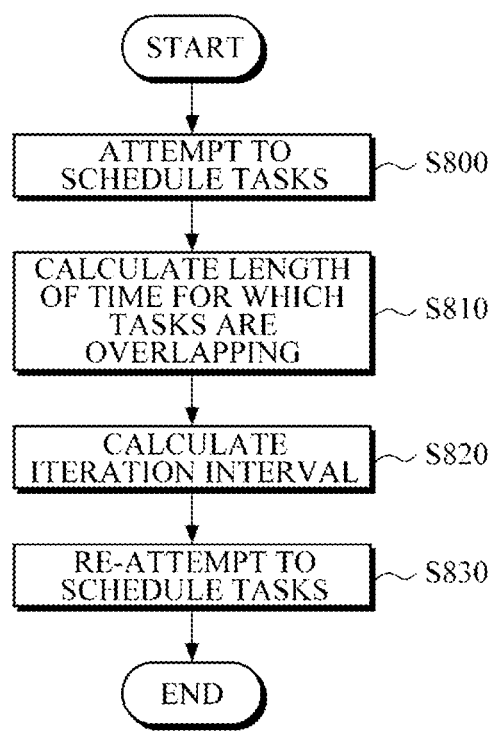
FIG. 13 is a flowchart illustrating a task scheduling method performed by a reconfigurable processor according to an exemplary embodiment.

FIG. 13 is a flowchart illustrating a task scheduling method performed by a reconfigurable processor according to another exemplary embodiment.

Referring to FIG. 13, the task scheduling method includes operations of attempting to schedule tasks (S800), calculating a length of an overlapping time period (S810), calculating an iteration interval (S820), and reattempting the scheduling (S830).

In operation S800, an attempt is made to schedule all tasks to be executed within a first time period.

If the task scheduling fails due to overlapping tasks, a length of a time period during which the tasks are overlapping is calculated operation S810. Then, a second time period is obtained by adding the first time period S820 and the calculated length of the overlapping time period and a new attempt to schedule the tasks with the second time period is made operation S830.

In addition, the task scheduling method of FIG. 13 may be applied to cyclic routines that are iteratively executed. Hence, if at least a part of a task is iteratively executed at a first iteration interval, a minimum value of an overlapping time period is obtained and a new iteration interval is set in operation S820 by adding the current iteration interval and the obtained minimum value. Then, scheduling attempts are repeatedly made under the conditions of a second iteration interval and a second time period in operation S830.

The current embodiments can be implemented as computer readable codes in a computer readable record medium. Codes and code segments constituting the computer program can be easily inferred by a skilled computer programmer in the art. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of compiling a program to be executed on a multicore processor, the method comprising:
    generating an initial solution by mapping a task to a source processing element (PE) and a destination PE, and selecting a first communication scheme for transmission of the task from the source PE to the destination PE;
    generating a new solution by changing the task mapping and selecting a second communication scheme, and determining whether to change the first communication scheme to the second communication scheme based on comparison of the new solution with the initial solution;
    approximately optimizing at least one of the task mapping and the first communication scheme included in the initial solution, and the task mapping and the second communication scheme included in the new solution; and
    scheduling task in the source PE and the destination PE, wherein the communication scheme is designated in a compiling process, and
    wherein the first communication scheme is a communication scheme that is based on a shared memory and the second communication scheme communication scheme that uses a scratch pad memory included in each of the source PE and the destination PE.

2. The method of claim 1, wherein the initial solution and the new solution are generated using a probabilistic algorithm.

3. The method of claim 2, wherein the probabilistic algorithm is a simulated annealing algorithm.

4. The method of claim 1, wherein the approximately optimizing of the mapping and communication scheme comprises:
    reassigning the task mapped to the source PE and the destination PE.

5. The method of claim 4, wherein the reassigning of the task comprises:
    remapping the task that has been mapped to the source PE and the destination PE to another PE at a first probability between 0 and 1.

6. The method of claim 5, wherein the remapping of the task comprises:
    replacing the task that has been remapped to the another PE with a second task by mapping the second task to the source PE and destination PE at a second probability between 0 and 1.

7. The method of claim 5, wherein the remapping of the task comprises:
    changing the communication scheme designated for transmission of the task to a new communication scheme at a third probability between 0 and 1.

8. The method of claim 1, wherein the approximately optimizing of the mapping and communication scheme is performed using a greedy algorithm heuristic.

9. The method of claim 1, wherein the approximately optimizing of the mapping and communication scheme comprises:
    eliminating violation, such that a size of data associated with the task mapped to the source PE and destination PE does not exceed a capacity of the scratch pad memory.

10. The method of claim 9, wherein the eliminating of the violation comprises:
    changing the second communication scheme designated for the task mapped to the source PE and destination PE to the first communication scheme.

11. The method of claim 10, wherein the eliminating of the violation is performed until violation is eliminated with respect to at least the source PE and the destination PE.

12. The method of claim 11, wherein the eliminating of the violation is performed sequentially on processing elements, starting from a processing element, from among at least the source PE and the destination PE, with a largest excess of data that exceeds the associated scratch pad memory.

13. The method of claim 1, wherein the approximately optimizing of the mapping and communication schemes comprises:
    enhancing a degree of utilization of the scratch pad memory with an unused space.

14. The method of claim 13, wherein the enhancing of the degree of utilization comprises:
    changing the first communication scheme of the task to the second communication scheme.

15. The method of claim 1, wherein the scheduling of the task comprises:
    attempting to schedule the task within a first time period;
    calculating a length of time during which the task is overlapping with another task in response to the scheduling attempt failing due to the task overlapping the another task; and
    re-attempting to schedule the task and the another task within a second time period which is equal to a sum of the first time period and the calculated length of time for which the task and the another task are overlapping.

16. The method of claim 15, wherein the scheduling of the two or more tasks comprises:
calculating a minimum value of the length of time for which tasks are overlapping in response to a part of the task being repeatedly executed at a first iteration interval; and
re-attempting to schedule the task to be repeatedly executed at a second iteration interval that is equal to a sum of the first iteration interval and the minimum value of the length of time for which tasks are overlapping.

17. The method of claim 1, further comprising:
evaluating a scheduling result subsequent to scheduling of the task.

18. The method of claim 17, further comprising:
re-generating the initial solution using the evaluation of the scheduling result.

19. The method of claim 1, wherein a second task is inversely mapped to the source PE and destination PE such that the second task will be switched with the task initially mapped, and
wherein the second communication scheme is selected for the transmission of the second task from the destination PE to the source PE.

20. A method of mapping a task in a multi-core processor, the method comprising:
mapping the task to a first processing element from among multiple processing elements in the multi-core processor;
moving the task from the first processing element to a second processing element at a first probability between 0 and 1;
replacing the task that has been moved to the second processing element at the first probability with another task mapped to a third processing element at a second probability between 0 and 1;
changing a first communication scheme designated for the task to a second communication scheme;
changing the selected communication scheme designated for the task to the first communication scheme or the second communication scheme which was previously unselected at a third probability between 0 and 1; and
changing the second communication scheme, when selected, of the task to the first communication scheme, such that a sum of data related to the task mapped to the particular processing element does not exceed capacity of a scratch pad memory of the particular processing element.

21. The method of claim 20,
wherein the task is designated with a communication scheme from at least one of a communication scheme that uses a shared memory and a communication scheme that uses at least one of scratch pad memory of the first processing element, a scratch pad memory of the second processing element, and a scratch pad memory of the third processing element.

22. The method of claim 20, further comprising:
changing the first communication scheme, when selected, of the task to the second communication scheme in response to a determination that the task is mapped to a processing element that contains a scratch pad memory with an unused space.

23. A method of scheduling tasks in a multi-core processor, the method comprising:
attempting to schedule two or more tasks within a first time period, wherein the two or more tasks are to be executed on two or more processing elements of a multi-core processor;
calculating a length of time during which the two or more tasks are overlapping each other in response to the scheduling attempt failing due to one task of the two or more tasks overlapping another task of the two or more tasks;
re-attempting to schedule the two or more tasks within a second time period that is equal to a sum of the first time period and the calculated length of time for which the tasks are overlapping;
calculating a minimum value of the length of time for which tasks are overlapping in response to a part of the task being repeatedly executed at a first iteration interval; and
re-attempting to schedule the task to be repeatedly executed at a second iteration interval that is equal to a sum of the first iteration interval and the minimum value of the length of time for which tasks are overlapping.

24. A method of mapping and scheduling a task on a multicore reconfigurable processor, the method comprising:
generating an initial solution for a task comprising a mapping, a communication scheme, and a scheduling;
changing the initial solution for the task by changing the mapping based on a first probability and changing the communication scheme according to a second probability;
rescheduling the task according to a calculated overlap value in response to a detection that the task overlaps with another task;
mapping the task to a source processing element (PE) and a destination PE;
selecting at least one of a shared memory communication scheme and a scratch pad memory communication scheme for transmitting the task from the source PE to the destination PE; and
scheduling a timing for the transmission of the task from the source PE to the destination PE,
wherein the communication scheme is designated in a compiling process.

* * * * *